United States Patent [19]
Yuki et al.

[11] Patent Number: 5,887,671
[45] Date of Patent: Mar. 30, 1999

[54] WORKING VEHICLE WITH POWER STEERING

[75] Inventors: Mikio Yuki; Hiroyuki Ogasawara; Masatake Murakawa; Kazuaki Kurohara; Nobuyuki Yamashita; Masaki Hayashi; Eriya Harada; Masatoshi Yamaguchi; Hiroki Nagai; Yoshio Tomiyama; Katsuhiko Uemura, all of Osaka, Japan

[73] Assignee: Kubota Corporation, Japan

[21] Appl. No.: 882,521

[22] Filed: Jun. 25, 1997

[30] Foreign Application Priority Data

Sep. 6, 1996 [JP] Japan ................................ 8-236256
Oct. 8, 1996 [JP] Japan ................................ 8-266820

[51] Int. Cl.$^6$ .................................................. B60K 11/06
[52] U.S. Cl. ........................................ 180/68.1; 180/68.4
[58] Field of Search ................................ 180/68.1, 68.4, 180/444, 446; 56/DIG. 22

[56] References Cited

U.S. PATENT DOCUMENTS

| | | | |
|---|---|---|---|
| 1,944,700 | 1/1934 | Tait, Jr. ................................. | 180/79.2 |
| 4,890,683 | 1/1990 | Matsuda et al. ...................... | 180/444 |
| 5,002,117 | 3/1991 | Buckley et al. ...................... | 180/68.4 |
| 5,113,819 | 5/1992 | Murakawa et al. .................. | 180/68.1 |
| 5,207,187 | 5/1993 | Kurohara ............................... | 123/41.7 |
| 5,445,237 | 8/1995 | Eda et al. ............................... | 180/444 |
| 5,531,466 | 7/1996 | Hayashi ................................. | 280/91.1 |
| 5,660,244 | 8/1997 | Matsuda ................................ | 180/68.1 |
| 5,678,648 | 10/1997 | Imanishi et al. ..................... | 180/68.1 |
| 5,678,649 | 10/1997 | Minoura et al. ...................... | 180/68.1 |
| 5,689,953 | 11/1997 | Yamashita et al. ................... | 180/68.1 |

FOREIGN PATENT DOCUMENTS

| | | | |
|---|---|---|---|
| 2200741 | 8/1988 | United Kingdom | F01P 3/18 |
| 2205540 | 12/1988 | United Kingdom | B60K 11/00 |
| 2297067 | 7/1996 | United Kingdom | B62D 5/04 |

*Primary Examiner*—J. J. Swann
*Assistant Examiner*—Michael Cuff
*Attorney, Agent, or Firm*—Webb Ziesenheim Bruening Logsdon Orkin & Hanson, P.C.

[57] ABSTRACT

A working vehicle with power steering, having a substantially closed accommodating space defined by an engine hood and a control panel, an engine disposed in the accommodating space and a steering shaft disposed in the control panel. A cooling fan produces cooling air flows moving toward the engine from an air intake formed in the control panel. A power steering apparatus for supplying steering assist power to the steering shaft, and a control unit for controlling the power steering apparatus, are arranged in the accommodating space to be exposed to the cooling air flows.

20 Claims, 12 Drawing Sheets

F I G .10
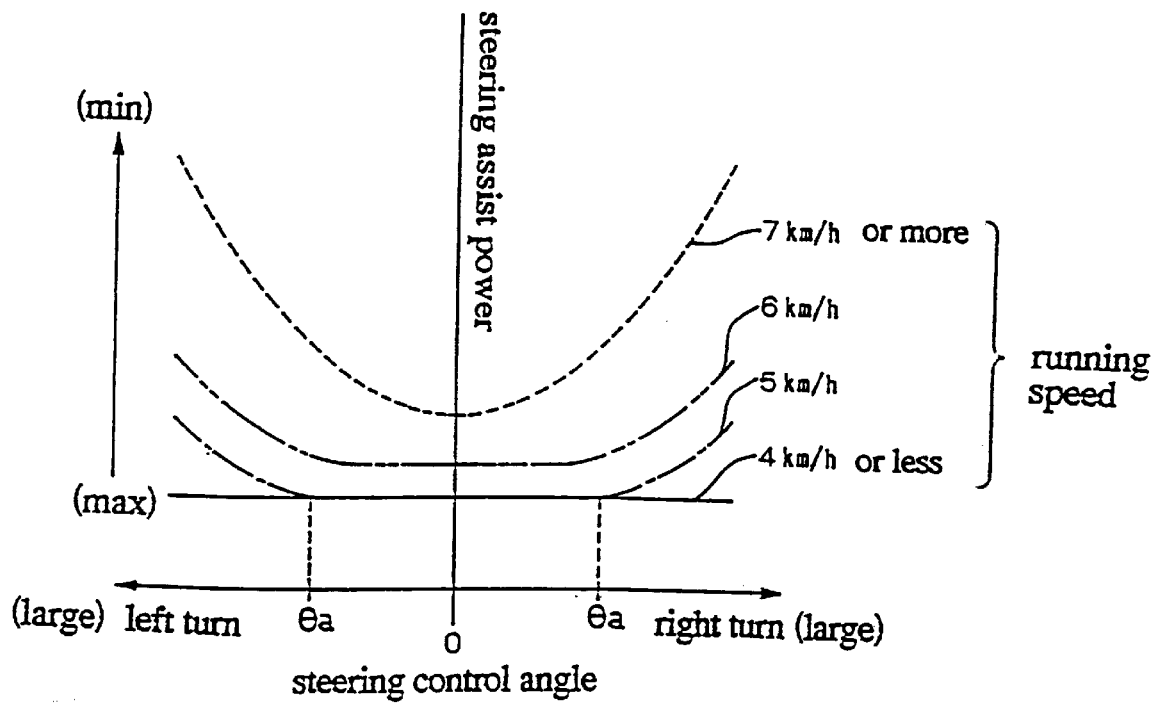

WORKING VEHICLE WITH POWER STEERING

BACKGROUND OF THE INVENTION

1. Field of the Invention

This invention relates to a working vehicle with power steering, having a substantially closed accommodating space defined by an engine hood and a control panel, an engine disposed in the engine hood, and a steering shaft disposed in the control panel.

2. Description of the Related Art

To facilitate turning of a steering wheel on grounds offering strong resistance to running or on inclined grounds, many working vehicles today have power steering apparatus for providing electric or hydraulic power to assist steering power.

Since the power steering apparatus generates power, main components thereof become heated. Therefore, heat must be taken into account in designing a layout of a steering control line, including the power steering apparatus, from the steering wheel to knuckle arms of dirigible wheels. There are severe space restrictions particularly with working vehicles such as a small working vehicle and a lawn tractor having a mower unit suspended below a vehicle body. For such working vehicles, it is not easy to design a steering control line layout in a way to solve the problem of heating.

SUMMARY OF THE INVENTION

The object of this invention is to provide a steering control line layout where measures are taken against heating, for a working vehicle with power steering, having a substantially closed accommodating space defined by an engine hood and a control panel, an engine disposed in the accommodating space, and a steering shaft disposed in the control panel.

The above object is fulfilled, according to this invention, by a working vehicle comprising a cooling fan for producing cooling air flows moving toward the engine from an air intake formed in the control panel, a power steering apparatus for supplying steering assist power to the steering shaft, and a control unit for controlling the power steering apparatus, wherein the power steering apparatus and the control unit are arranged in the accommodating space to be exposed to the cooling air flows.

With the above construction, the power steering apparatus and the control unit are constantly exposed to the cooling air flows moving toward the engine from the air intake formed in the control panel during an operation. Thus, the motor of the power steering apparatus and the control unit are restrained from becoming hot. Normally, the air intake for drawing engine cooling air has a dust-proof structure, so that dust is barred from entry with ambient air to affect the control unit and other components.

The steering shaft may be supported by a hollow steering column projecting into the accommodating space, the steering column defining an auxiliary air intake for drawing in auxiliary cooling air flows which join the cooling air flows. The auxiliary cooling air flows drawn through the auxiliary air intake formed in the bottom of the steering column join the cooling air flows drawn through the air intake formed in the control panel. Consequently, cooling air flows in an increased quantity through the accommodating space to promote the cooling effect therein. Heating of the motor of the power steering apparatus and the control unit is restrained with increased effect. The confluent air flows, of course, have an increased effect of cooling the engine, whereby the electric motor and the control unit are protected from being heated by the heat radiating from the engine.

The power steering apparatus may typically be hydraulically or electrically operable. The electrical apparatus employing an electric motor has the advantage in simplicity of construction and low manufacturing cost over the hydraulic apparatus requiring a hydraulic pump and hydraulic piping. The electric motor is controlled based on a result of detection by a torque sensor for detecting a control torque occurring during a steering operation. Where such an electrically operable power steering apparatus is employed, the above construction for exposing the electric motor and control unit to the cooling air flows contributes toward avoidance of inconveniences caused by a temperature increase of the electric motor and control unit.

In a further preferred embodiment of this invention, the electric motor is powered by a battery disposed in the accommodating space to be exposed to the cooling air flows.

Where the working vehicle with power steering according to this invention is a lawn tractor, special care must be taken in designing a layout of a steering control line since a mower unit is suspended below a vehicle body.

A lawn tractor with power steering for supplying steering assist power to a steering shaft, according to this invention, comprises:

body frames extending longitudinally of a vehicle body and supporting a mower unit in suspension;

an engine hood mounted on the body frames;

a control panel mounted on the body frames, and defining a substantially closed accommodating space with the engine hood;

an engine mounted on the body frames and enclosed in the accommodating space;

a power steering apparatus disposed in the accommodating space for supplying the steering assist power to the steering shaft;

a cooling fan for producing cooling air flows moving toward the engine from an air intake formed in the control panel; and a steering power converting mechanism for converting the steering control power assisted by the power steering apparatus into a reciprocating motion for transmission to knuckle arms of dirigible wheels, the steering power converting mechanism being disposed along the body frames.

The steering power converting mechanism outputs a motion reciprocating longitudinally of the vehicle body to the knuckle arms. Thus, the converting mechanism is disposed at substantially the same height as the body frames of the vehicle body. Where the mower unit is vertically movably supported between front and rear wheels, generally, a power input including an input belt pulley projects upward from an upper surface of a blade housing. Therefore, where the power converting mechanism is disposed between the right and left body frames, it is necessary to set an upper limit to the vertical movement of the mower unit so that its power input remains out of contact with the power converting mechanism when the mower unit is raised. This results in an inconvenience of providing a relatively short stroke for vertical adjustment of the mower unit. In this invention, the power converting mechanism is disposed laterally of one of the body frames. The power input does not contact the power converting mechanism even when the mower unit is raised. The mower unit may be raised until the surface of the blade housing is close to lower surfaces of the body frames, with the power input moving into a space between the right and left body frames. Even where the power steering apparatus is included in the steering control line, its layout may be devised according to this invention in such a way that the steering control line has no adverse influence on the vertical stroke of the mower unit.

The steering power converting mechanism outputs a motion reciprocating longitudinally of the vehicle body to the knuckle arms as noted above. Thus, the converting mechanism is disposed at substantially the same height as the knuckle arms. The power steering apparatus has an output disposed at a relatively low level. Without a cover disposed below the output, sand and stones flying from the ground would tend to hit and adhere to the output. Where the steering power converting mechanism is disposed above the mower unit according this invention, the lower position of the steering power converting mechanism is covered by the housing of the mower unit. Sand and stones are prevented from hitting and adhering to the steering power converting mechanism.

Other features and advantages of this invention will be apparent from the following description of the embodiments to be taken with reference to the drawings.

BRIEF DESCRIPTION OF THE DRAWINGS

FIG. 10 is a graph showing a relationship, determined by the control system, among running speed, steering angle and steering assist power;

DESCRIPTION OF THE PREFERRED EMBODIMENTS

An embodiment of this invention will be described hereinafter with reference to the drawings.

Figure 1:
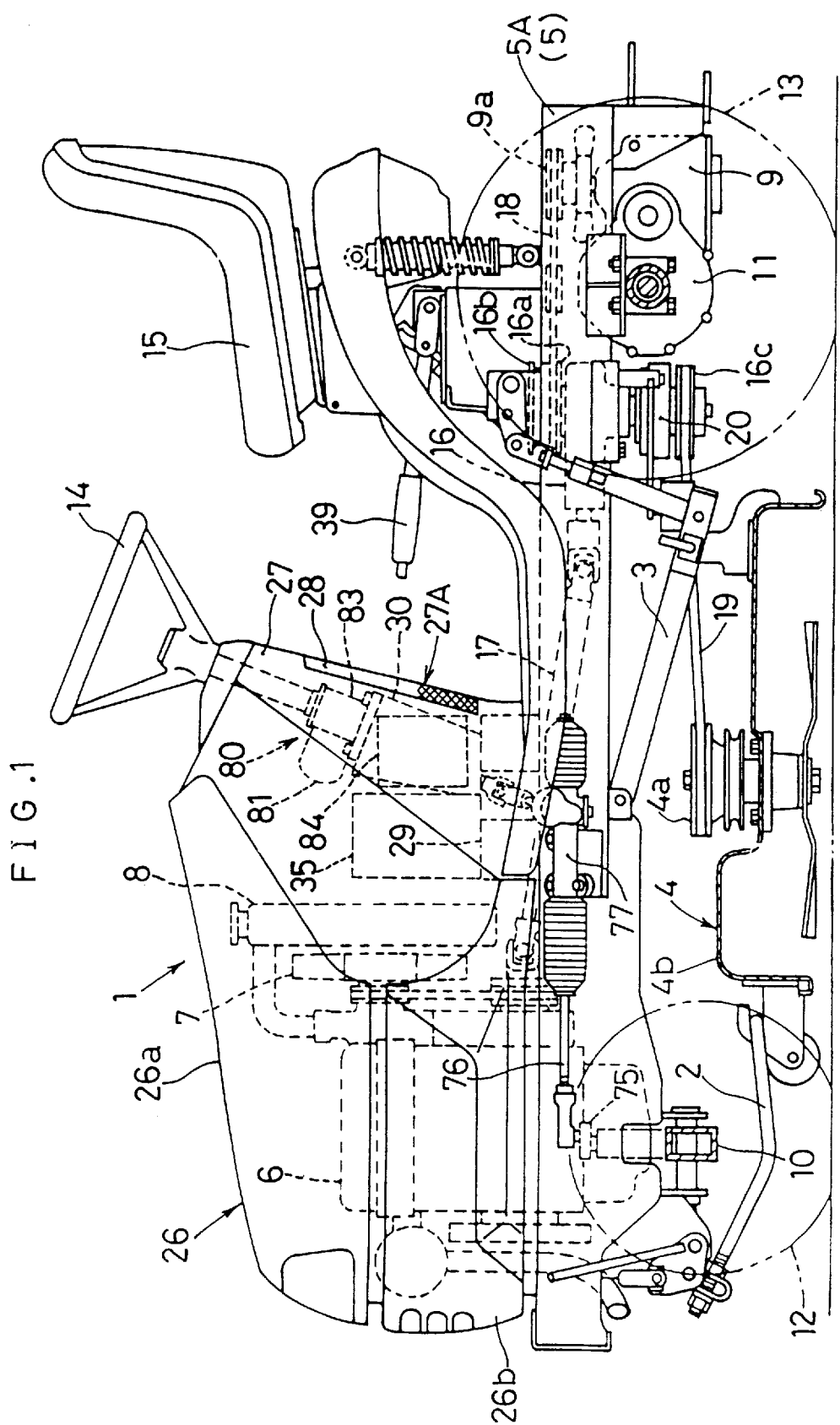
FIG. 1 is a side elevation of a riding lawn mower.

FIG. 1 shows a side elevation of a riding mower. This riding mower is a mid-mount type mower tractor with a mower unit 4 suspended from a longitudinally middle position of a vehicle body 1 through a parallelogram linkage having front links 2 and rear links 3. The vehicle body 1 includes a body frame 5 having a pair of right and left main frames 5A, a horizontal shaft type engine 6 mounted on a front portion of the body frame 5, a cooling fan 7 disposed rearwardly of the engine 6, a radiator 8 disposed rearwardly of the cooling fan 7, a hydrostatic stepless transmission 9 connected to a rear position of the body frame 5, an axle frame 10 connected to a lower front position of the body frame 5, an axle case 11 connected to a lower rear position of the body frame 5, front wheels 12 acting as dirigible wheels attached to opposite, right and left ends of the axle frame 10, respectively, rear wheels 13 acting as drive wheels attached to opposite, right and left ends of the axle case 11, respectively, a steering wheel 14 interlocked to the front wheels 12, and a driver's seat 15 disposed above the rear portion of the body frame 5.

Figure 2:
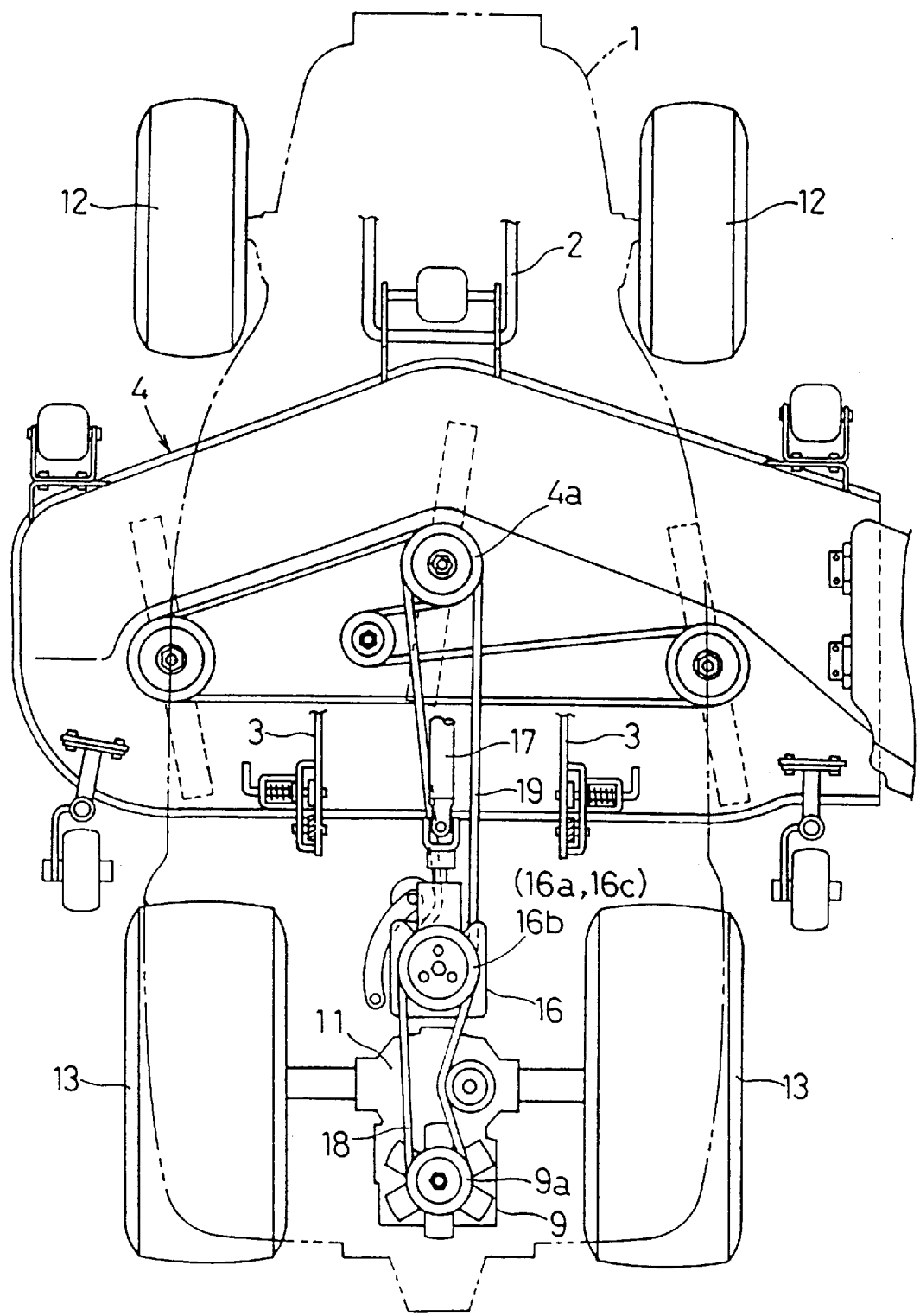
FIG. 2 is a plan view of the riding lawn mower showing a transmission structure.

As shown in FIGS. 1 and 2, a transmission case 16 having a bevel gear transmission mechanism (not shown) mounted therein is supported by the body frame 5 forwardly of the axle case 11. The transmission case 16 is connected to the engine 6 through a transmission shaft 17 extending forward from the transmission case 16. The transmission case 16 has a first output pulley 16a and a second output pulley 16b arranged vertically thereon. The first output pulley 16a is connected through a first transmission belt 18 to an input pulley 9a of the hydrostatic stepless transmission 9. The second output pulley 16b supplies power to a blower (not shown) for causing grass clippings to flow from the mower unit 4 to a grass catcher (not shown) attached to the rear of the vehicle body 1. Further, the transmission case 16 has a third output pulley 16c attached thereto through an electromagnetic clutch 20 and connected through a second transmission belt 19 to an input pulley 4a protruding upward from a ceiling of a housing 4b of the mower unit 4.

Figure 3:
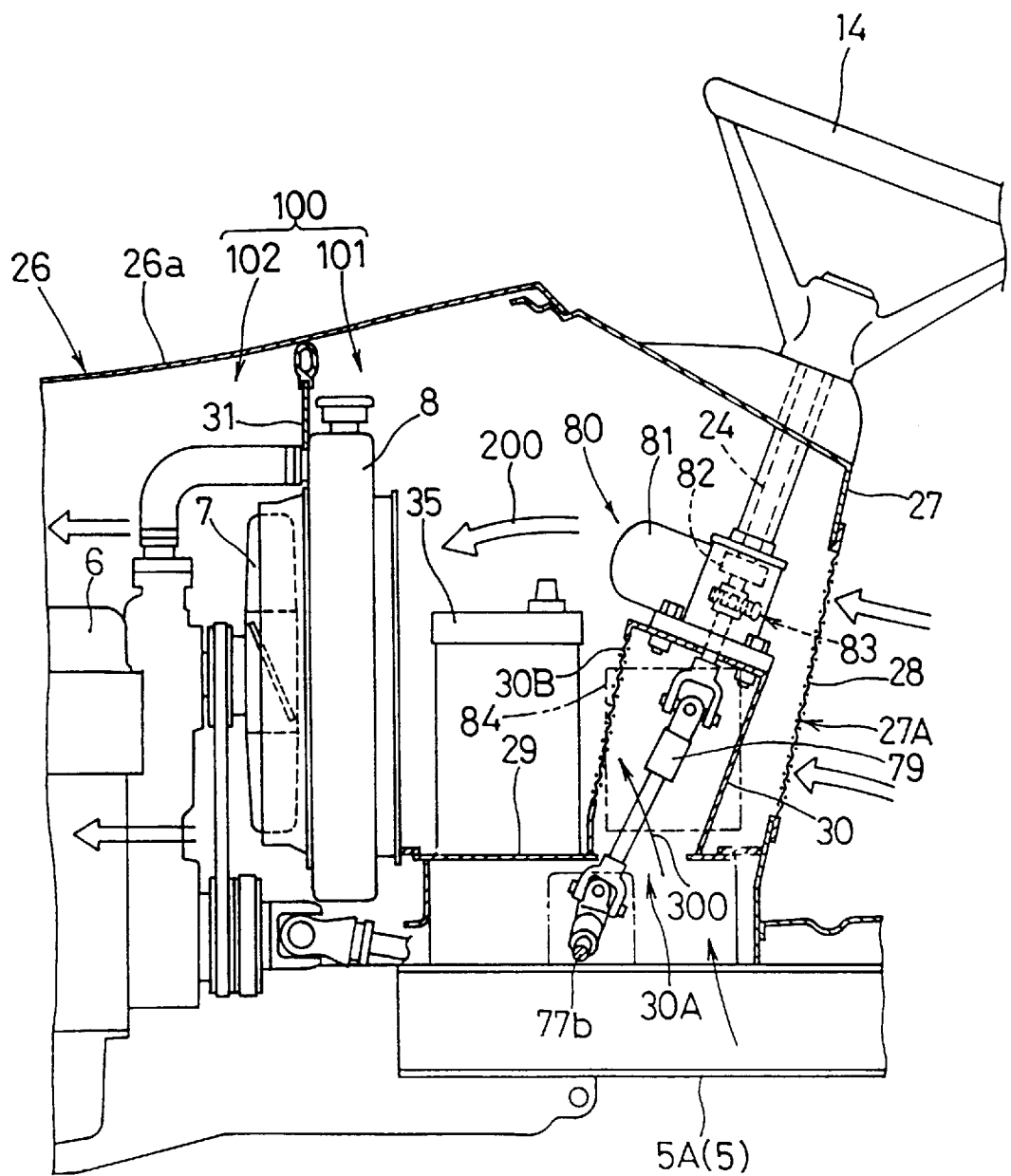
FIG. 3 is a side view in vertical section of a principal portion of the riding lawn mower showing an arrangement of a power steering apparatus and a battery.
Figure 4:
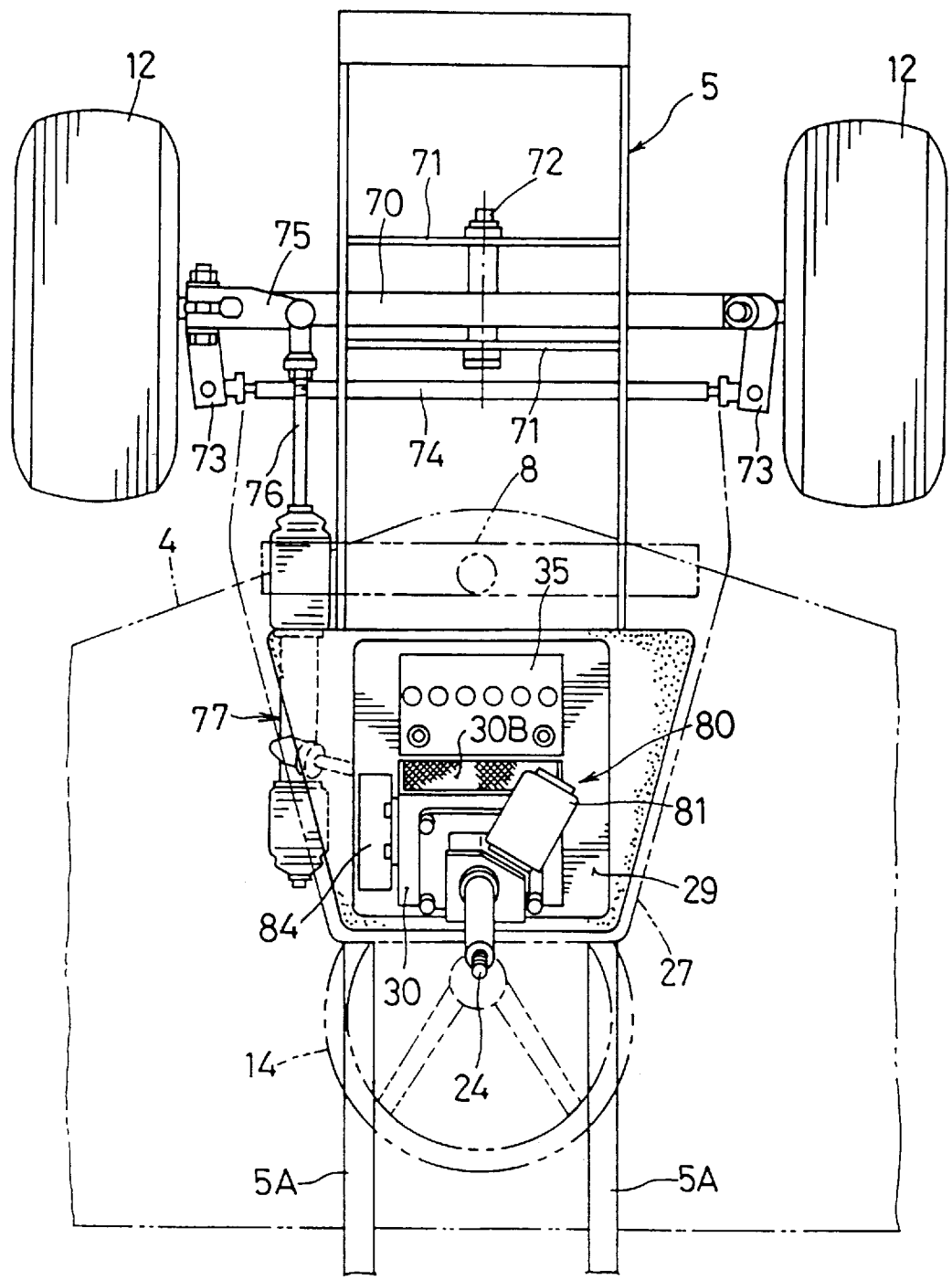
FIG. 4 is a plan view in cross section of a front half of the riding lawn mower showing the arrangement of the power steering apparatus and the battery.

As shown in FIGS. 1, 3 and 4, the engine 6 and radiator 8 disposed on the front portion of the vehicle body 1 are covered by an engine hood 26 including a pivotable upper hood 26a and a fixed lower hood 26b. A steering shaft 24 erected approximately centrally of the vehicle body 1 is surrounded from behind by a control panel 27 continuous with the engine hood 26. The control panel 27 includes an air intake 27A formed in a lower portion thereof for drawing in ambient air with rotation of the cooling fan 7. A dust netting 28 is applied to the air intake 27A to provide a dust-proof structure for preventing grass clippings, dust and so on from entering through the air intake 27A along with ambient air during a grass cutting operation. A supporting base 29 is provided to close an area of the body frame 5 from the radiator 8 to the control panel 27. A box-like steering column 30 is formed integral with a rear end of the supporting base 29 for supporting the steering shaft 24.

Further, a partition 31 extends between peripheries of the radiator 8 and the engine hood 26. Thus, a substantially closed accommodating space 100 defined by the engine hood 26 and control panel 27 is divided into a first accommodating space 101 accommodating the steering column 30 and a second accommodating space 102 accommodating the engine 6, with the radiator 8 standing in between. Consequently, a cooling air passage 200 is formed in the accommodating space 100, where, with rotation of the cooling fan 7, cooling air flows from the air intake 27A through the radiator 8 to the engine 6.

Figure 5:
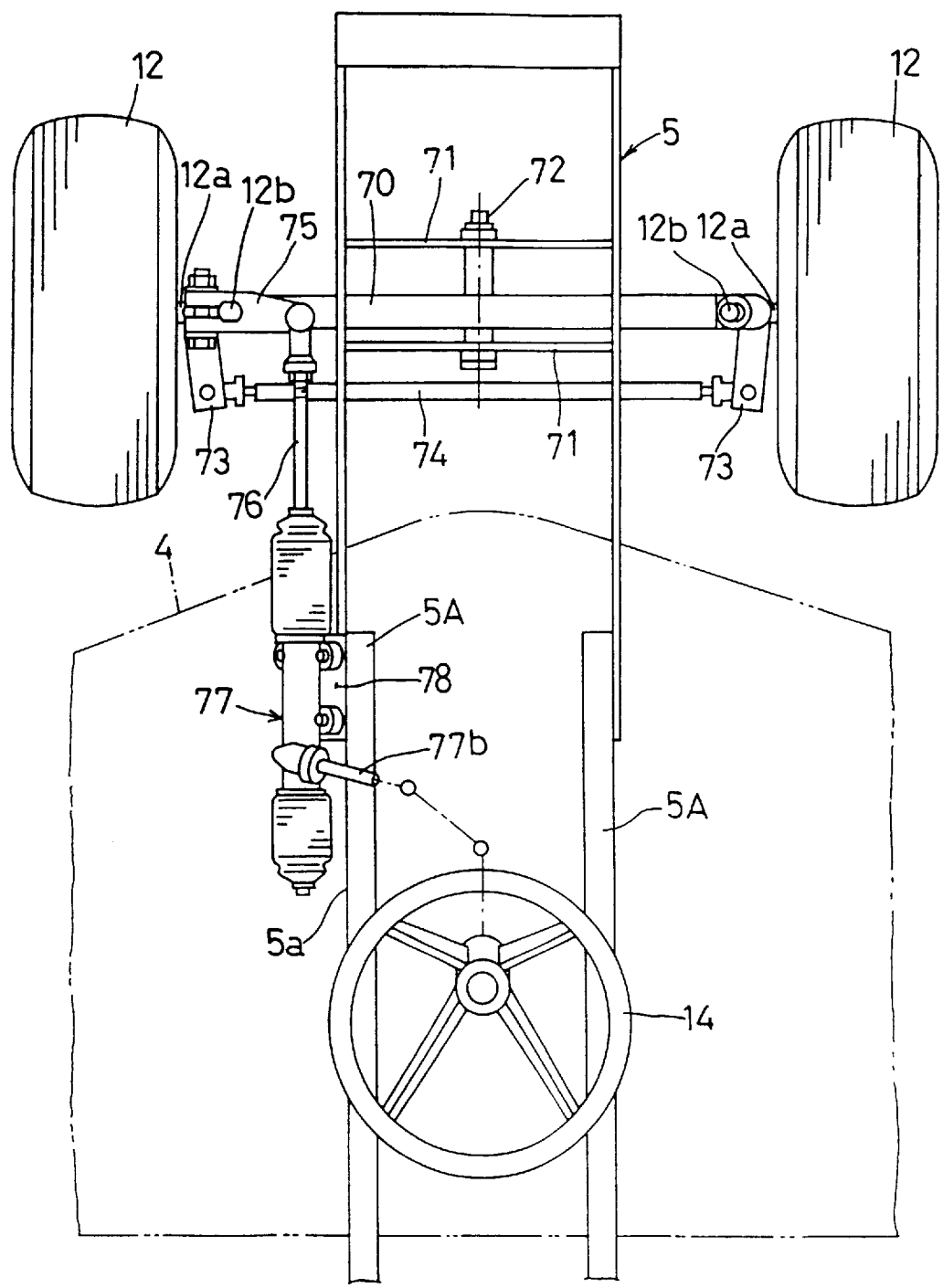
FIG. 5 is a plan view of an output of the power steering apparatus.

As shown in FIG. 5, a knuckle shaft 12b extends vertically of the vehicle body from an end of an axle 12a rotatably supporting the left front wheel 12, and is pivotably supported at one end of a front wheel support frame 70. A knuckle shaft 12b extends vertically of the vehicle body from an end of an axle 12b rotatably supporting the right front wheel 12, and is pivotably supported at the other end of the front wheel support frame 70. The front wheel support frame 70 is oscillatably supported in an intermediate position thereof transversely of the vehicle body, by the body frame 5 through a pair of front and rear brackets 71 extending between forward portions of the right and left body frames 5A, and a pivotal axis 72 supported by the two brackets 71 and extending longitudinally of the vehicle body. A first knuckle arm 73 is connected to a lower end of the knuckle shaft 12b of the left front wheel 1 to be pivotable together. A first knuckle arm 73 is connected to a lower end of the knuckle shaft 12b of the right front wheel 1 to be pivotable together. The two knuckle shafts 12b are interlocked through a tie rod 74 to be pivotable in the same direction. A second knuckle arm 75 is connected to an upper end of the knuckle shaft 12b of the left front wheel 12 to be pivotable together. The second knuckle arm 75 is connected through a drag link 76 to an output shaft 77a of a steering power converting mechanism 77. This converting mechanism 77 is supported by the body frame 5 through a bracket 78. Specifically, the converting mechanism 77 is bolted to the bracket 78 fixed to an outer lateral surface 5a of the left body frame 5A directly over the mower unit 4, so that an area below the converting mechanism 77 is covered by the blade housing 4b and that the converting mechanism 77 presents no obstruction to ascent of the input belt pulley 56. As seen from FIG. 6, the converting mechanism 77 includes an input shaft 77b extending obliquely upward and inward with respect to the vehicle body. The input shaft 77b is connected through a rotary shaft 79 to a lower end of the steering shaft 24. The steering shaft 24 is provided with a power steering apparatus 80 having an electric motor 81.

Figure 6:
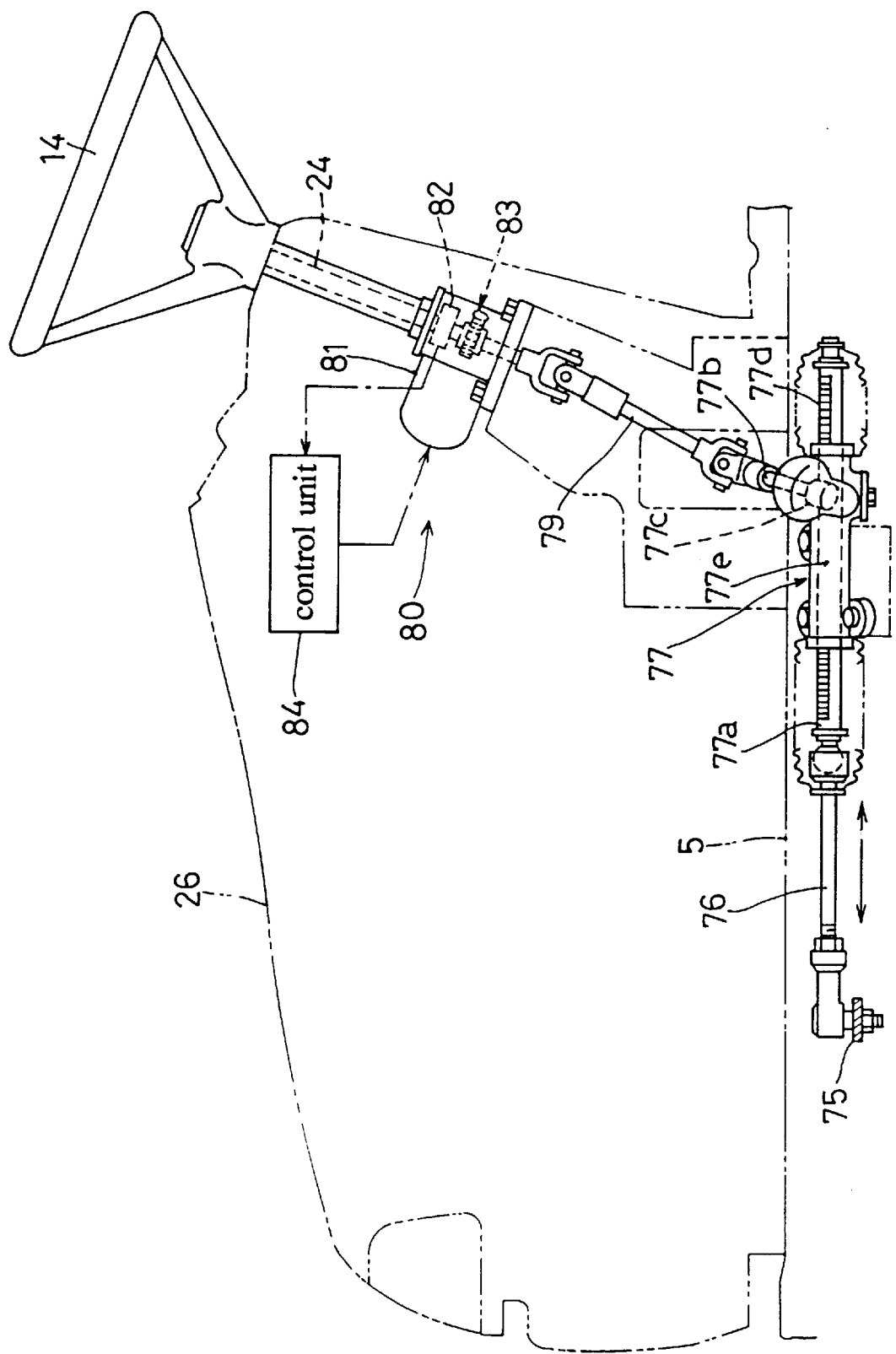
FIG. 6 is a side view of the power steering apparatus.

When the steering wheel 14 is turned, the steering shaft 24 rotates with the steering wheel 14, and its torque is transmitted to the input shaft 77b of the converting mechanism 77 through the rotary shaft 79. As shown in FIG. 6, the converting mechanism 77 has, mounted in a gear case 77e, a pinion gear 77c rotatable with the input shaft 77b, and a rack gear 77d meshed with the pinion gear 77c and connected at one end thereof to the output shaft 77a. Thus, the converting mechanism 77, with the pinion gear 77c and rack gear 77d, converts the torque of the input shaft 77b to linear power acting in the longitudinal direction of the vehicle body. The linear power is outputted from the output shaft 77a to the drag link 76. Then, the drag link 76 is driven longitudinally of the vehicle body. The second knuckle arm 75 pivots about a vertical axis of the knuckle shaft 12b. The knuckle shaft 12b of the left front wheel 12 pivots relative to the front wheel support frame 70. This torque is transmitted from the first knuckle arm 73 of the left front wheel to the first knuckle arm 73 of the right front wheel through the tie rod 74. The knuckle shaft 12b of the right front wheel 12 pivots relative to the front wheel support frame 70 in the opposite direction to the knuckle shaft 12b of the left front wheel 12. As a result, the left and right front wheels 12 are turned in a direction corresponding to a turning direction of the steering wheel 14, and by an angle corresponding to a turning angle of the steering wheel 14.

Figure 7:
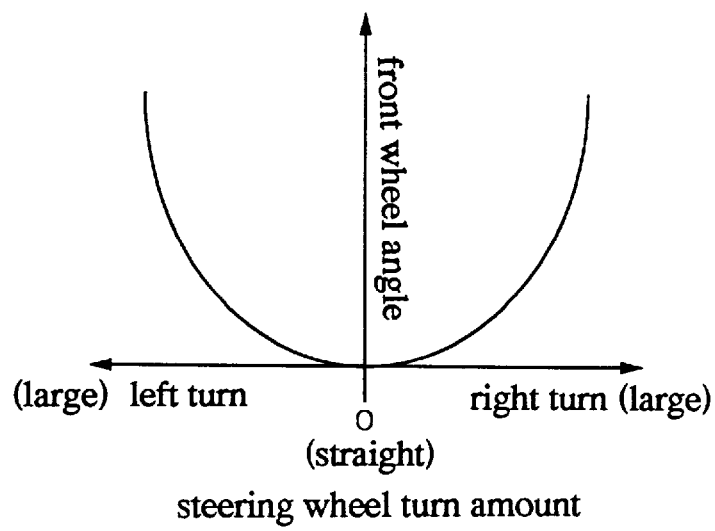
FIG. 7 is a graph showing a relationship, determined by a transmission mechanism, between turning amount of the steering wheel and steering angle of front wheels.

A relationship between amount of operation of the steering wheel 14 and steering angle of the front wheels 12 will be described in detail now. The converting mechanism 77 has the meshing teeth of the rack and pinion set to varied pitches, whereby the relationship between amount of operation of the steering wheel 14 and steering angle of the front wheels 12 describes a characteristic curve as shown in FIG. 7. That is, the converting mechanism 77 is set such that the smaller the amount of operation from a straight-ahead position (neutral position) of the steering wheel 14, the smaller variation occurs in the steering angle of the front wheels 12 (that is, the larger the amount of operation from the straight-ahead position of the steering wheel 14, the greater variation occurs in the steering angle of the front wheels 12). Thus, variations in the steering angle of the front wheels 12 are suppressed when a slight deviation occurs with the steering wheel 14 as a result of shaking or the like of the vehicle body 1 during a straight running, grass cutting operation. The vehicle body 1 may easily be maintained in straight running state, to leave neat-cut, straight traces.

As shown in FIGS. 1, 3, 4 and 6, a steering control line extending from the front wheels 12 to the steering wheel 14 includes an electrically operated power steering apparatus 80. The power steering apparatus 80 includes a torque sensor 82 attached to the steering shaft 24, an electric motor 81 for supplying steering assist power to the steering shaft 24 through a bevel gear mechanism 83, and a control unit 84 for controlling operation of the electric motor 81 based on results of detection received from the torque sensor 82. The torque sensor 82 detects a control torque acting on the steering shaft 24 with rotation of the steering wheel 14. The control unit 84 controls operation of the electric motor 81 based on the detection. The power (steering assist power) derived from operation of the electric motor 81 is transmitted to the steering shaft 24 through the bevel gear mechanism 83. Thus, the steering shaft 24 is rotatable with the aid of the steering assist power from the electric motor 81. That is, the turning force applied to the steering wheel 14 may be lessened during a steering operation.

As shown in FIG. 3, the electric motor 81 of the power steering apparatus 80 is connected to a vertically intermediate position of the steering shaft 24. The control unit 84 is connected to the left side of the steering column 30. That is, the electric motor 81 of the power steering apparatus 80 and the control unit 84 are arranged in the cooling air passage 200. Consequently, the electric motor 81 and control unit 84 are constantly exposed to and cooled by the cooling air flowing from the air intake 27A of the control panel 27 to the engine 6 during operation of the cooling fan 7. The temperatures of the electric motor 81 and control unit 84 are prevented from rising during operation of the power steering apparatus 80. That is, the temperatures of the electric motor 81 and control unit 84 are suppressed during operation of the power steering apparatus 80. With the electric motor 81 of the power steering apparatus 80 and the control unit 84 arranged in the cooling air passage 200 defined by the engine hood 26, control panel 27 and supporting base 29, these electrical components are protected against direct contact with water. Even if water should adhere to these electrical components, the water could be blown off by the cooling air flows. Thus, the power steering apparatus 80 has advantageous waterproofing features. Moreover, since the air intake 27A has a dust-proof structure, dust and grass clippings resulting from a grass cutting operation are prevented from flowing in with ambient air to affect the electric motor 81 of the power steering apparatus 80, the control unit 84, the engine 6 and the like.

As shown in FIGS. 3 and 4, the steering column 30 formed integral with the rear end of the supporting base 29 has an opening 30A formed in the bottom thereof, and a dust netting 30B defining a front wall thereof. Thus, the steering column 30 defines an auxiliary cooling air passage 300 for drawing in auxiliary cooling air flows through the bottom opening 30A and directing the air flows into the cooling air passage 200. A battery 35 for supplying electric power to the power steering apparatus 80 and the like is mounted on the supporting base 29 immediately forwardly of the dust netting 30B of the steering column 30. Thus, the battery 35 is disposed in the auxiliary cooling air passage 300 to be exposed to and cooled, during operation of the cooling fan 7, by the auxiliary cooling air flows drawn through the opening 30A formed in the bottom of the steering column 30. In this way, heating of the battery 35 is suppressed, thereby to restrain the temperatures of the electric motor 81 of the power steering apparatus 80 and the control unit 84 from rising under the influence of heat radiating from the battery 35.

The power steering apparatus 80 and battery 35 may be arranged close to each other while achieving improved cooling efficiency. Thus, a harness around these components may be simplified and shortened. This achieves a simplified structure for installing the power steering apparatus 80, and restrains a voltage drop between the battery 35 and power steering apparatus 80. Moreover, since the auxiliary cooling air passage 300 has a dust-proof structure, dust and grass clippings resulting from a grass cutting operation are prevented from flowing in with ambient air to affect the electric motor 81 of the power steering apparatus 80, the control unit 84, the engine 6 and the like. With the dust netting 30B applied to the front wall further inward than the bottom opening 30A of the steering column 30, there is less chance of grass clippings adhering to this dust netting 30B than where the dust netting 30B is applied to the bottom opening 30A. Since the dust netting 30B extends vertically, dust and grass clippings adhering to the dust netting 30B, if any, will fall naturally when the cooling fan 7 stops. In this way, the dust netting 30B is protected against clogging by dust and grass clippings.

As shown in FIGS. 1, 3 and 4, the electric motor 81 of the power steering apparatus 80 is oriented obliquely forward and rightward or forward and leftward from the steering shaft 24 (oriented forward and rightward in this embodiment, and the forward and leftward orientation is not illustrated). Such orientation of the electric motor 81 avoids the inconvenience of diminishing a riding space on the vehicle body 1 as in the case of the electric motor 81 being oriented sideways or obliquely rearward from the steering shaft 24. The electric motor 81 is clear of the battery 35 in plane view, not to obstruct change and maintenance of the battery 35.

Figure 8:
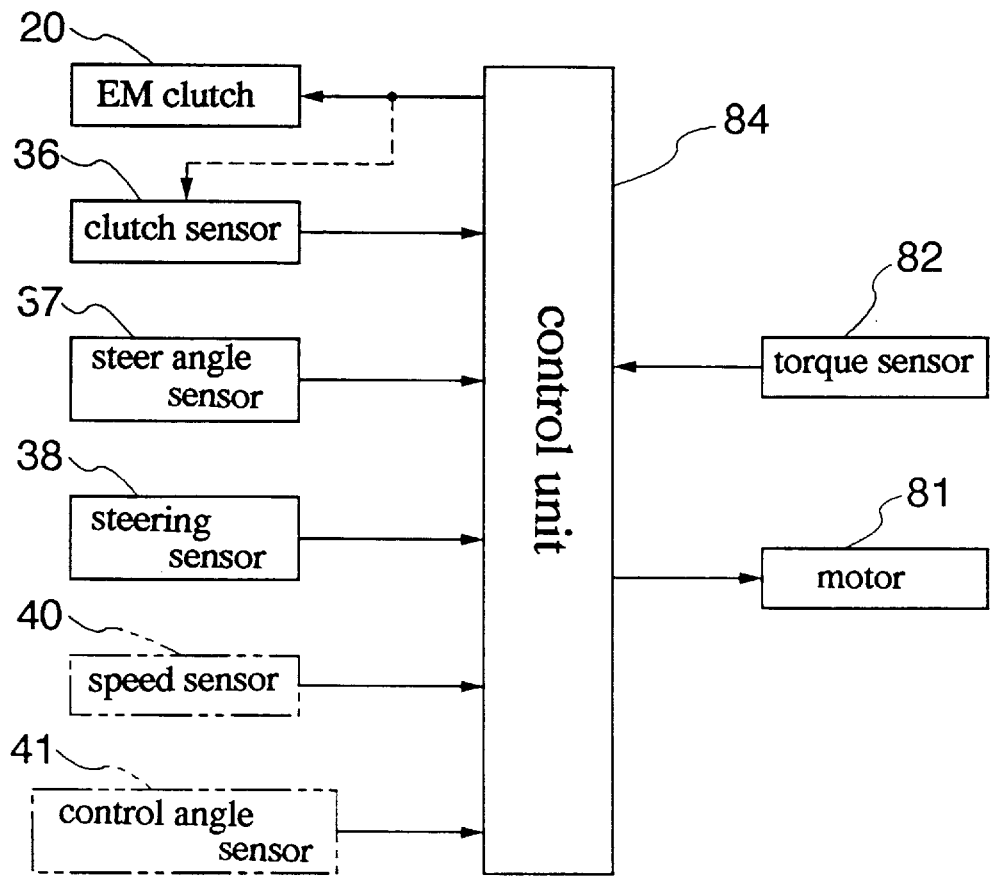
FIG. 8 is a block diagram of a control system for controlling the power steering apparatus.

As shown in FIG. 8, the vehicle body 1 includes a clutch sensor 36 for detecting an operating state of the mower unit 4 from electrification of the electromagnetic clutch 20, a steering angle sensor 37 for detecting a steering angle of the front wheels 12, and a steering sensor 38 for detecting a turning direction of the steering wheel 14. The control unit 84 of the power steering apparatus 80 receives detection information from the respective sensors 36–38. Based on the detection information, the control unit 84 controls the electric motor 81 to adjust the steering assist power outputted from the electric motor 81.

Figure 9:
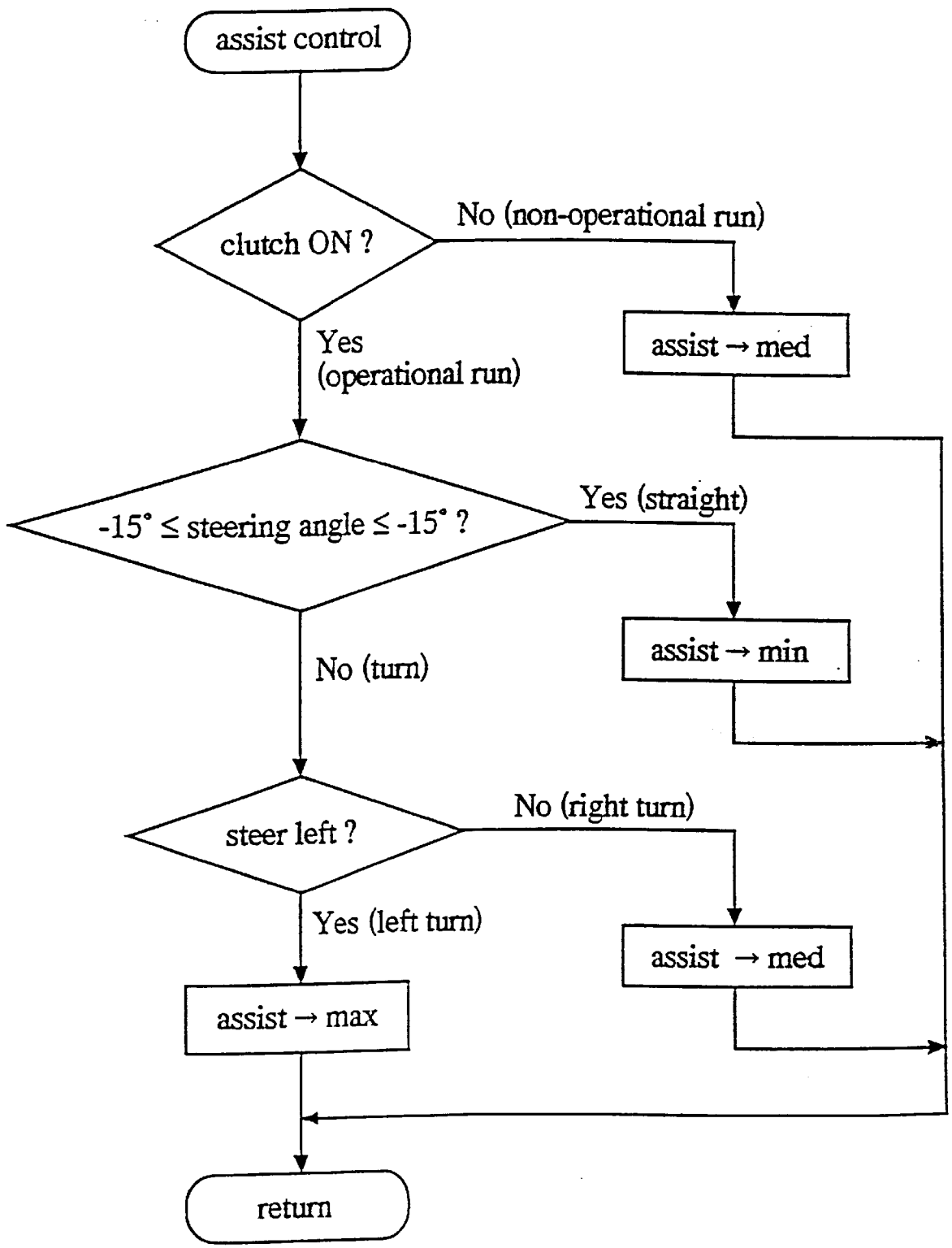
FIG. 9 is a flowchart showing a sequence of adjustment of steering assisting power based on running conditions.

This control will particularly be described with reference to FIG. 9. The mower runs faster and steering effort is lighter during a non-operational run than during an operational run. Thus, when the clutch sensor 36 detects a disengaged state of the electromagnetic clutch 20 indicative of a non-operational run, the control unit 84 controls the electric motor 81 to output "medium" steering assist power. When the clutch sensor 36 detects an engaged state of the electromagnetic clutch 20 indicative of an operational run, the control unit 84 first checks whether a steering angle of the front wheels 12 detected by the steering angle sensor 37 is in a 15° range with the straight-ahead position regarded as 0° If the steering angle is in that range, the control unit 84 determines that the mower is running straight, and controls the electric motor 81 to output "minimum" steering assist power. Thus, during a straight running, grass cutting operation, the electric motor 81 is controlled to output "minimum" steering assist power, thereby making the steering operation heavy to cause the mower to run straight reliably. This is effective to avoid a situation where the driver loses control of the steering wheel 14 under the influence of an uneven or inclined ground surface. This feature assures that no disturbed cutting traces are left as a result of unsteady running of the mower. If the steering angle is outside the 15° range with the straight-ahead position regarded as 0° the control unit 84 determines that the mower is making a turn, and confirms a turning direction from a turning direction of the steering wheel 14 detected by the steering sensor 38. When the mower is making a "left" turn, the control unit 84 controls the electric motor 81 to output "maximum" steering assist power. Conversely, when the mower is making a "right" turn, the control unit 84 controls the electric motor 81 to output "medium" steering assist power. Generally, the riding lawn mower has the mower unit 4 offset leftward with respect to the vehicle body 1. The mower unit 4 often has an opening (not shown) formed at a righthand end thereof for discharging grass clippings. The mower usually makes left turns during a grass cutting operation. When the mower makes a left turn, therefore, the electric motor 81 is controlled to output "maximum" steering assist power, to lighten the steering effort and facilitate turning to the left. When the mower makes a right turn, the electric motor 81 is controlled to output "medium" steering assist power, to render the steering operation relatively heavy and turning of the wheel to the right difficult.

The clutch sensor 36 may be replaced with a lever sensor (not shown) for detecting a position of a control lever 39 used to raise and lower the mower unit 4 manually. Then, the control unit 84 detects an operating state of the mower unit 4 from the position of the control lever 39 (height of the mower unit 4) detected by the lever sensor. One of the steering angle sensor 37 and steering sensor 38 may be adapted to detect a steering angle of the front wheels 12 (turning angle of the steering wheel 14) and a turning direction of the steering wheel 14 (a steering direction of the front wheels 12).

The faster running speed enables the lighter steering. As noted hereinbefore, the converting mechanism 77 is set such that the larger the amount of operation (i.e. turning angle) from the straight-ahead position of the steering wheel 14, the greater variation occurs in the steering angle of the front wheels 12. Thus, as shown in two-dot-and-dash lines in FIG. 8, the mower may include a running speed sensor 40 for detecting running speed, and a steering control angle sensor 41 for detecting a turning angle of the steering wheel 14. During an operational run, the control unit 84 controls the electric motor 81, as shown in FIG. 10, based on detection information from the running speed sensor 40 and steering control angle sensor 41, to adjust the steering assist power outputted from the electric motor 81. More particularly, when the running speed detected by the running speed sensor 40 is 4 km/h or less, the steering operation is sufficiently heavy. In this case, the electric motor 81 is controlled to output "maximum" steering assist power irrespective of the turning angle of the steering wheel 14 detected by the steering control angle sensor 41. When the running speed detected by the running speed sensor 40 is 4 km/h to 5 km/h, the steering operation is relatively heavy. In this case, the electric motor 81 is controlled to output "maximum" steering assist power until the turning angle of the steering wheel 14 detected by the steering control angle sensor 41 reaches a predetermined turning angle θa. After the turning angle of the steering wheel 14 reaches the predetermined turning angle θa, the electric motor 81 is controlled to output the steering assist power reduced (to make the steering operation heavier) at the greater rate of variation the larger the turning angle of the steering wheel 14 becomes. When the running speed detected by the running speed sensor 40 is 5 km/h or higher, the electric motor 81 is controlled to reduce the predetermined turning angle θa of the steering wheel 14 which is the starting point of the above control for reducing the steering assist power (making the steering operation heavier) at the greater rate of variation the larger the turning angle of the steering wheel 14 becomes. That is, the electric motor 81 is controlled to make the steering operation the heavier, the faster the running speed and the larger the turning angle of the steering wheel 14 become. In this way, a small sharp turn is made difficult during an operational run, to protect the lawn from damage done by such a small sharp turn.

The steering control angle sensor 41 may be replaced with the steering angle sensor 37 for detecting a steering angle of the front wheels 12, or the steering sensor 38 for detecting a turning direction of the steering wheel 14.

[Other Embodiments]

Other embodiment of this invention are listed hereunder.

Figure 11:
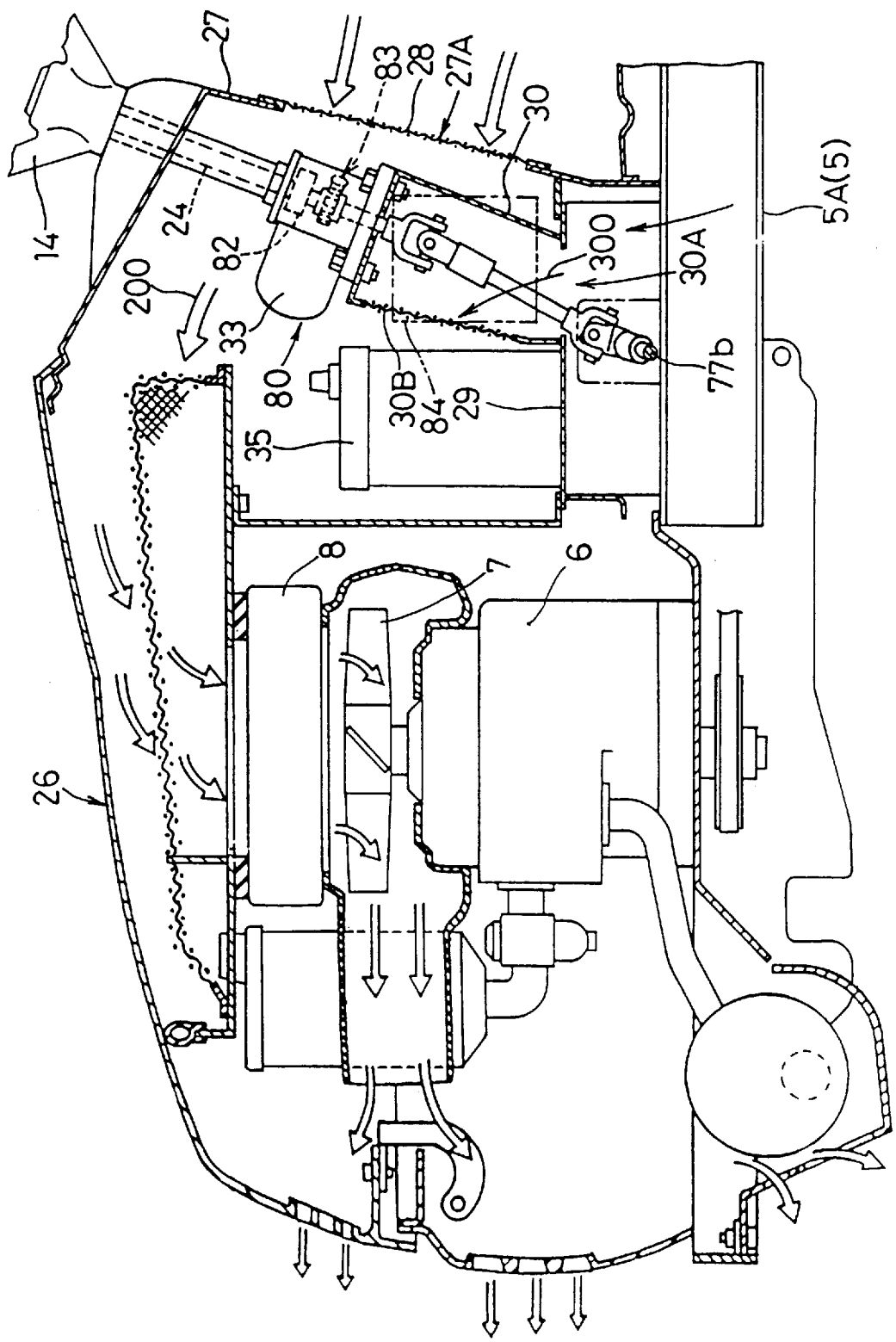
FIG. 11 is a side view in vertical section of a front half of a riding lawn mower in another embodiment of the invention.

(1) In the foregoing embodiment, the vehicle body 1 has a horizontal shaft type engine 6 mounted on a front portion of the body frame 5, a cooling fan 7 and a radiator 8 arranged rearwardly of the engine 6, an air intake 27A formed in a lower portion of a control panel 27 erected rearwardly of the radiator 8. Thus, a cooling air passage 200 is formed for allowing cooling air to flow from the air intake 27A toward the radiator 8 linearly along the longitudinal direction of the vehicle body. As shown in FIG. 11, the vehicle body 1 may have a vertical shaft type engine 6 mounted on a front portion of the body frame 5, a cooling fan 7 and a radiator 8 arranged above the engine 6, and an air intake 27A formed in a lower portion of a control panel 27 erected rearwardly of the engine 6. Thus, a cooling air passage 200 is formed for allowing cooling air to flow from the air intake 27A upward and forward toward the radiator 8.

Figure 12:
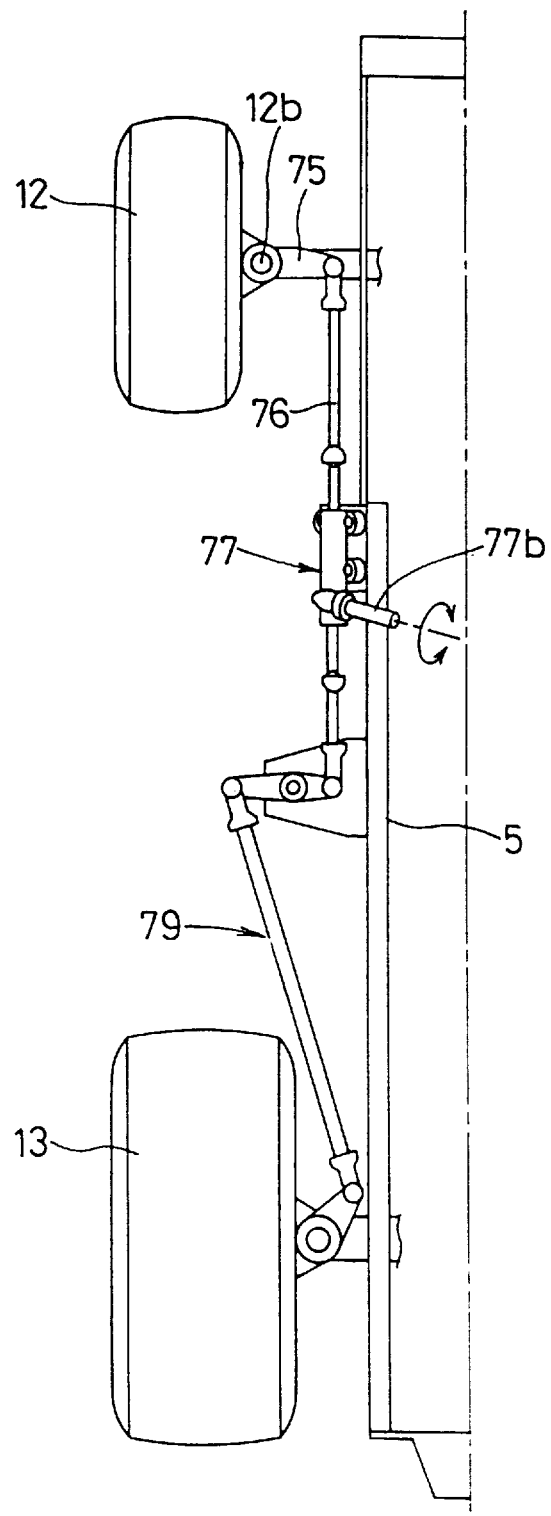
FIG. 12 is a plan view of a steering power transmission line in a four wheel steering mode.

(2) The foregoing embodiment exemplifies a vehicle body 1 of the front wheel steering type. The vehicle body 1 may be the rear wheel steering type with the steering wheel 14 interlocked to the rear wheels 13. As shown in FIG. 12, the vehicle body 12 may be the four wheel steering type additionally including a rear wheel steering link mechanism 79.

Figure 13:
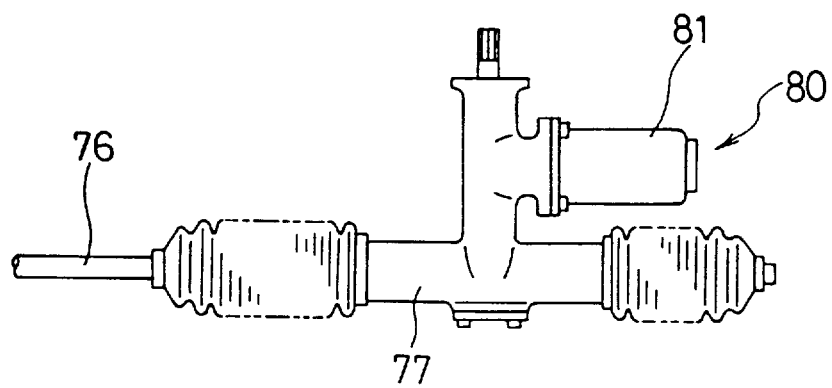
FIG. 13 is a plan view showing a layout of an electric motor and a steering power converting mechanism in a further embodiment of the invention.

(3) As shown in FIG. 13, the electric motor 81 of the power steering apparatus 80 may be formed integral with the rack and pinion type converting mechanism 77, and disposed in the cooling air passage 200 by shifting the air intake 27A downward. According to this construction, the relatively heavy electric motor 81 may be placed in a lower position of the vehicle body 1, to lower the center of gravity of the vehicle body, thereby improving its stability. The integration of the electric motor 81 and converting mechanism 77 results in a simplified construction and reduced manufacturing cost.

(4) The steering column 30 may have a dust netting 30B applied to the ceiling thereof, so that the electric motor 81 of the power steering apparatus 80 is situated also in the auxiliary cooling air passage 300. This construction can cool the electric motor 81 of the power steering apparatus 80 with increased effect. The steering column 30 may have a dust netting 30B applied to the left wall thereof, so that the control unit 84 of the power steering apparatus 80 is situated also in the auxiliary cooling air passage 300. This construction can cool the control unit 84 of the power steering apparatus 80 with increased effect.

(5) A perforated metal sheet or the like may be used instead of the dust netting 30B to provide the auxiliary cooling air passage 300 with a dust-proof structure.

What is claimed is:

1. A working vehicle with power steering, having a substantially closed accommodating space defined by an engine hood and a control panel, a horizontal shaft type engine disposed in the accommodating space, and a steering shaft disposed in the control panel, said working vehicle comprising:

an air intake formed in said control panel;

a radiator disposed vertically between said engine and said steering shaft, said radiator dividing said accommodating space into a first accommodating space for accommodating said steering shaft and a second accommodating space for accommodating said engine, said first accommodating space and said second accommodating space being disposed side by side in a longitudinal direction of the vehicle;

a cooling fan attached to said radiator, said cooling fan having a horizontal rotary shaft and producing substantially parallel cooling air flows moving from said air intake through said first accommodating space to said second accommodating space;

power steering means for supplying steering assist power to said steering shaft; and control means for controlling said power steering means;

wherein said power steering means and said control means are arranged in said first accommodating space so as to be exposed to said cooling air flows entering said air intake.

2. A working vehicle as defined in claim 1, wherein said steering shaft is supported by a hollow steering column projecting into said first accommodating space, said steering column defining an auxiliary air intake for drawing in auxiliary cooling air flows which join said substantially parallel cooling air flows.

3. A working vehicle as defined in claim 1, wherein said power steering means includes an electric motor, and said control means includes a torque sensor for detecting a control torque occurring during a steering operation, said control means controlling said electric motor based on a result of detection by said torque sensor.

4. A working vehicle as defined in claim 3, wherein said electric motor is powered by a battery disposed in said accommodating space to be exposed to said cooling air flows.

5. A working vehicle with power steering having a substantially closed accommodating space defined by an engine hood and a control panel, a vertical shaft type engine disposed in the accommodating space, and a steering shaft disposed in the control panel, said working vehicle comprising:

an air intake formed in said control panel;

a radiator disposed horizontally and located above said engine;

a vertical partition for dividing, in combination with said radiator, said accommodating space into a first accommodating space for accommodating said steering shaft and a second accommodating space for accommodating said engine, said first accommodating space overhanging said second accommodating space;

power steering means for supplying steering assist power to said steering shaft;

control means for controlling said power steering means; and a cooling fan attached to said radiator, said cooling fan having a vertical rotary shaft and producing substantially parallel cooling air flows moving from said air intake through said first accommodating space to said radiator, in said second accommodating space wherein said power steering means and said control means are arranged in said first accommodating space so as to be exposed to said cooling air flows entering said air intake.

6. A working vehicle as defined in claim 5, wherein said control means is disposed in said first accommodating space to be exposed to said cooling air flows.

7. A working vehicle as defined in claim 5, wherein said power steering means includes an electric motor, and said control means includes a torque sensor for detecting a control torque occurring during a steering operation, said control means controlling said electric motor based on a result of detection by said torque sensor.

8. A working vehicle as defined in claim 7, wherein said electric motor is powered by a battery disposed in said accommodating space to be exposed to said cooling air flows.

9. A lawn tractor as defined in claim 5, wherein said steering shaft is supported by a hollow steering column projecting into said first accommodating space, said steering column defining an auxiliary air intake for drawing in auxiliary cooling air flows which join said substantially parallel cooling air flows.

10. A lawn tractor with power steering for supplying steering assist power to a steering shaft, comprising:

body frames extending longitudinally of a vehicle body and supporting a mower unit in suspension;

an engine hood mounted on said body frames;

a control panel mounted on said body frames, and defining a substantially closed first accommodating space with said engine hood;

an air intake formed in the control panel;

an engine mounted on said body frames and enclosed in a second accommodating space;

power steering means disposed in said first accommodating space for supplying steering assist power to a steering shaft;

control means for controlling said power steering means;

a cooling fan space for producing substantially parallel cooling air flows moving from the air intake formed in the control panel through said first accommodating space to said second accommodating space;

steering power converting means for converting the steering control power assisted by said power steering means into a reciprocating motion for transmission by a linkage to a knuckle arm assembly connected to dirigible wheels of the lawn tractor, said steering power converting means being disposed along said body frames, and wherein said steering shaft is supported by a hollow steering column protecting into said accommodating space, said steering column defining an auxiliary air intake for drawing in auxiliary cooling air flows which join said substantially parallel cooling air flows.

11. A lawn tractor as defined in claim 10, wherein said steering power converting means is disposed above said mower unit.

12. A lawn tractor as defined in claim 10, wherein said steering power converting means is disposed laterally of one of said body frames.

13. A lawn tractor as defined in claim 10, wherein said power steering means includes an electric motor, and said control means includes a torque sensor for detecting a control torque occurring during a steering operation, said control means controlling said electric motor based on a result of detection by said torque sensor.

14. A lawn tractor as defined in claim 12, wherein said electric motor is powered by a battery disposed in said accommodating space to be exposed to said cooling air flows.

15. A lawn tractor as defined in claim 10, wherein the knuckle arm assembly includes:

a wheel support frame oscillatably supported by the body frames and positioned substantially transverse to the body frames;

two knuckle shafts extending substantially vertically through the wheel support frame and rotatably secured therethrough;

a first knuckle arm connected to a lower end of each of the knuckle shafts;

a second knuckle arm connected to an upper end of at least one of the knuckle shafts; and a tie rod connected between the first knuckle arms, wherein the steering power converting means is connected to the second knuckle arm by the linkage.

16. A lawn tractor with power steering for supplying steering assist power to a steering shaft, comprising:

body frames extending longitudinally of a vehicle body and supporting a mower unit in suspension;

an engine hood mounted on said body frames;

a control panel mounted on said body frames, and defining a substantially closed first accommodating space with said engine hood;

an air intake formed in the control panel;

an engine mounted on said body frames and enclosed in a second accommodating space;

power steering means disposed in said first accommodating space for supplying the steering assist power to said steering shaft;

control means for controlling said power steering means;

a cooling fan for producing substantially parallel cooling air flows moving from the air intake formed in said control panel through said first accommodating space to said second accommodating space; and steering power converting means for converting the steering control power assisted by said power steering means into a reciprocating motion for transmission by a linkage to a knuckle arm assembly connected to dirigible wheels of the lawn tractor, said steering power converting means being disposed along said body frames.

17. A lawn tractor as defined in claim 16, wherein the knuckle arm assembly includes:

a wheel support frame oscillatably supported by the body frames and positioned substantially transverse to the body frames;

two knuckle shafts extending substantially vertically through the wheel support frame and rotatably secured therethrough;

a first knuckle arm connected to a lower end of each of the knuckle shafts;

a second knuckle arm connected to an upper end of at least one of the knuckle shafts; and a tie rod connected between the first knuckle arms, wherein the steering power converting means is connected to the second knuckle arm by the linkage.

18. A lawn tractor as defined in claim 16, wherein said steering shaft is supported by a hollow steering column projecting into said first accommodating space, said steering column defining an auxiliary air intake for drawing in auxiliary cooling air flows which join said substantially parallel cooling air flows.

19. A lawn tractor as defined in claim 16, wherein said power steering means includes an electric motor, and said control means includes a torque sensor for detecting a control torque occurring during a steering operation, said control means controlling said electric motor based on a result of detection by said torque sensor.

20. A lawn tractor as defined in claim 19, wherein said electric motor is powered by a battery disposed in said accommodating space to be exposed to said cooling air flows.

* * * * *

UNITED STATES PATENT AND TRADEMARK OFFICE
CERTIFICATE OF CORRECTION

PATENT NO. : 5,887,671
DATED : March 30, 1999
INVENTOR(S) : Mikio Yuki et al.

It is certified that error appears in the above-identified patent and that said Letters Patent is hereby corrected as shown below:

Title Page, under [56] References Cited, U.S. PATENT DOCUMENTS, insert:
--3,063,226   11/13/62   Pfauser......--.

Column 8 Line 2 between "0°" and "If" insert period --.--.

Column 11 Line 13 Claim 5 after "radiator" delete comma --,--.

Column 11 Line 13 Claim 5 after "space" insert comma --,--.

Column 11 Line 54 Claim 10 delete --space--.

Column 11 Line 66 "protecting" should read --projecting--.

Column 12 Line 15 Claim 14 "in claim 12" should read --in claim 13--.

Signed and Sealed this

Nineteenth Day of October, 1999

Attest:

Attesting Officer

Q. TODD DICKINSON

Acting Commissioner of Patents and Trademarks